though the pipe coupling is a device for connecting two sections of pipe, the packing material 10 is made of rubber or other yieldable material,

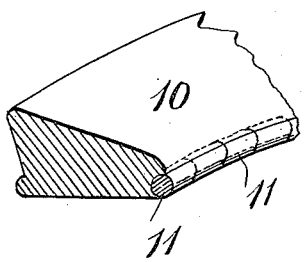
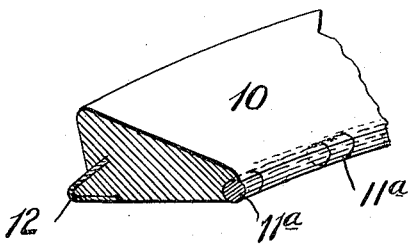
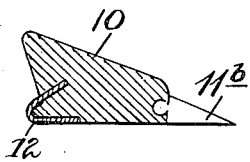
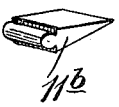
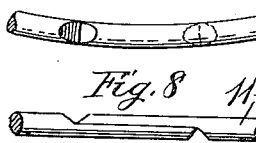
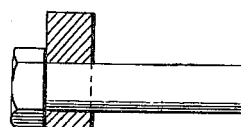
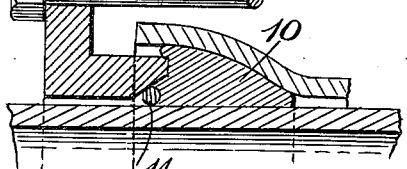
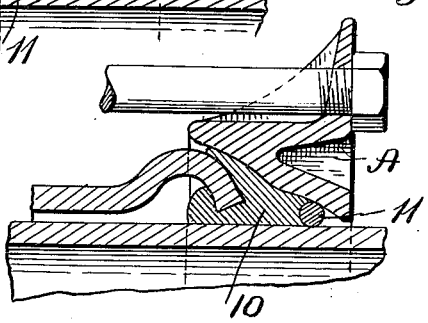
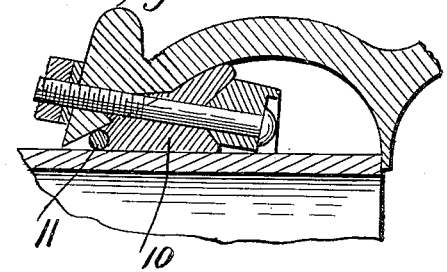

UNITED STATES PATENT OFFICE.

ANDREW WALTER GRAHAM, OF BRADFORD, PENNSYLVANIA.

PIPE-COUPLING PACKING.

No. 870,428.

Specification of Letters Patent.

Patented Nov. 5, 1907.

Application filed March 3, 1906. Serial No. 304,106.

*To all whom it may concern:*

Be it known that I, ANDREW WALTER GRAHAM, a citizen of the United States, residing at Bradford, in the county of McKean and State of Pennsylvania, have invented certain new and useful Improvements in Pipe-Coupling Packings, of which the following is a specification.

This invention relates to pipe couplings and has for one of its objects to provide a novel means for firmly gripping the pipe sections and preventing longitudinal movement thereof, this being of exceptional value in pipe lines running over heavy grades or through water courses.

A further object of the invention is to prevent waste and displacement of the packing material, and to permit the use of packing rings of the same size on pipes or in connection with couplings or followers of varying diameter.

A still further object of the invention is to provide a packing formed of yieldable material, such as rubber, and metal, in which provision is made for preventing contact between the rubber and the liquid flowing through the pipe, with a view of avoiding deterioration of the packing.

With these and other objects in view, the invention consists in the novel construction and arrangement of parts hereinafter set forth.

In the accompanying drawings—Figure 1 is a sectional perspective view of a portion of a pipe coupling packing constructed in accordance with the invention; Fig. 2 is a similar view, showing the gripping members spaced; Fig. 3 is a sectional view of a still further modification; Figs. 4, 5 and 6 are detail views of different forms of pipe gripping and packing holding members which may be employed; Fig. 7 is a detail view of a portion of a gripping and clamping ring which may be employed; Fig. 8 is an elevation of the same; Fig. 9 is a detail sectional view of a portion of a pipe coupling showing the packing ring in position; Figs. 10 and 11 are similar views illustrating further forms of couplings in which the device may be employed.

Similar numerals of reference are employed to illustrate corresponding parts throughout the several figures of the drawings.

In pipe couplings when rubber and other packings are employed much difficulty is experienced in securing tight joints, especially when the follower rings are somewhat larger than usual and the packing rings are often forced from place, or blown out by the pressure within the pipe. The pipe sections moreover may slip and disconnect a joint where the line runs over a heavy grade.

In carrying out the present invention, these and other difficulties are overcome by the employment of pipe gripping and packing holding members which are placed within the followers and are firmly pressed against the pipe as the packing is compressed.

In carrying out the present invention the packing ring 10, formed of rubber or other yieldable material, is made tapering or of wedge like form in cross section, and at the smallest angle is placed a pipe gripping and packing holding device 11 which may assume a variety of forms and which may be made of any suitable material, iron or steel being preferably employed. This pipe gripping and packing holding member may be formed of a number of small cylindrical blocks placed end to end as shown in Fig. 1, to form a sectional ring, or may be of different contour, as hereinafter described.

In Fig. 9 is shown a well known form of coupling in which the packing is placed within the tapering bore of the follower A and as the packing ring is compressed, the sectional ring 11 presses tightly around the pipe and aside from gripping the latter, will prevent the passage of any part of the packing ring beyond the outer edge of said follower. This is of exceptional value in cases where the follower is a trifle large and when pressure on the packing would tend to force the same outward through the follower.

Where the pipe line is used for the passage of certain fluids which if brought into contact with the rubber packing rings would result in chemical reactions tending to deteriorate the packing, for instance, crude oil, the inner face of the packing ring, is provided with a shield 12 formed of lead, copper or other soft metal, as shown in Fig. 2 and this shield is so located as to be engaged by the end of the spacing sleeve and preferably is channeled to embrace a part of the rubber packing, so that it may yield and in yielding, compress the rubber, but at the same time prevent direct contact between the liquid and the packing proper. Fig. 2 further illustrates a modification of the invention wherein the members 11 are spaced as shown at 11$^a$ to afford spaced pipe gripping and packing holding devices.

In Fig. 3 is illustrated a further modification in which the pipe gripping and holding member 11$^b$ is wedge like in form and is provided with a curved lug at its rear edge for connection with the rubber packing ring. The detailed construction of this member is shown in Fig. 4, and Figs. 5 and 6 illustrate different forms of gripping and holding members which may be employed.

The pipe gripping and packing holding member may, in some cases, be in the form of a split ring 11$^d$, as shown in Figs. 7 and 8, and in this case, may be partly embedded in the yieldable packing ring or may be wholly detached therefrom.

One application of the invention is illustrated in Fig. 9, but the device may be employed in connection with other known forms of couplings as shown in Figs. 10 and 11.

It is obvious that these pipe gripping and packing holding devices may be made of any size; of any shape; may be integral or sectional, and that they may be formed of any material, and it is further obvious that they may be separate from or may form a part of the packing member without departing from the invention.

Having thus described my invention, what I claim as new and desire to secure by Letters Patent is:

1. A packing for pipe couplings, consisting of a compressible ring of wedge shape cross section, and a pipe gripping member of rigid material embedded in the edge of said ring and protruding therebeyond.

2. A packing for pipe couplings, consisting of a compressible ring of wedge shape cross section, and a pipe gripping member of rigid material embedded in the edge of said ring and protruding therebeyond, said member being formed of a multiplicity of sections.

3. A packing for pipe couplings, consisting of a compressible ring of wedge shape cross section, and a pipe gripping member of rigid material embedded in the edge of said ring, said member being formed of a multiplicity of sections, said sections being spaced.

4. A packing for pipe couplings, consisting of a compressible ring of wedge shape cross section, and a pipe gripping member of rigid material embedded in the smaller edge of said ring, said member being of wedge shape.

5. A packing for pipe couplings, consisting of a compressible ring of wedge shape cross section, and a pipe gripping member of rigid material embedded in the smaller edge of said ring, said member being of wedge shape and formed of a multiplicity of sections.

6. A packing for pipe couplings, consisting of a compressible ring of wedge shape cross section, and a pipe gripping member of rigid material embedded in the smaller edge of said ring, said ring having at its wider edge a shield of soft metal.

In testimony whereof I have signed my name to this specification in the presence of two subscribing witnesses.

ANDREW WALTER GRAHAM.

Witnesses:
BENNETT S. JONES,
ALBERT POPKINS.